(12) United States Patent
Bruno et al.

(10) Patent No.: US 7,073,429 B2
(45) Date of Patent: Jul. 11, 2006

(54) COOKING GRATE WITH GREASE CONTROL STRUCTURES

(75) Inventors: Adrian A. Bruno, Rolling Meadows, IL (US); Erich Schlosser, Barrington, IL (US); Mark Johnson, Cary, IL (US)

(73) Assignee: Weber-Stephen Products Co., Palatine, IL (US)

( * ) Notice: Subject to any disclaimer, the term of this patent is extended or adjusted under 35 U.S.C. 154(b) by 242 days.

(21) Appl. No.: 10/318,948

(22) Filed: Dec. 13, 2002

(65) Prior Publication Data

US 2004/0112362 A1   Jun. 17, 2004

(51) Int. Cl.
*A47J 37/10* (2006.01)

(52) U.S. Cl. .............................. 99/400; 99/445; 99/450; 126/41 R

(58) Field of Classification Search .................. 99/425, 99/445, 446, 450, 400, 401; 126/41 R
See application file for complete search history.

(56) References Cited

U.S. PATENT DOCUMENTS

| | | | |
|---|---|---|---|
| 1,483,159 A | 2/1924 | Coleman | |
| 2,154,305 A | 4/1939 | Goerl | |
| 2,253,834 A * | 8/1941 | Volks | ........................ 99/446 |
| 2,787,995 A | 4/1957 | Alter | |
| 3,033,191 A | 5/1962 | Bonadiman | |
| 3,094,113 A | 6/1963 | Avila | |
| 3,330,266 A | 7/1967 | Stephen | |
| 3,418,921 A * | 12/1968 | Fautz | ........................ 99/445 |
| 3,452,736 A | 7/1969 | Harff et al. | |
| 3,586,518 A | 6/1971 | Folmar | |
| 3,611,911 A | 10/1971 | Martin | |
| 3,611,915 A | 10/1971 | Glaser et al. | |
| 3,688,758 A | 9/1972 | Stephen | |

(Continued)

FOREIGN PATENT DOCUMENTS

GB           492713 A      9/1938

*Primary Examiner*—Reginald L. Alexander
(74) *Attorney, Agent, or Firm*—Baker & McKenzie LLP

(57) ABSTRACT

The present invention provides a cooking grate for use within a barbecue grill assembly comprising a cooking chamber and a gas burner positioned in a lower portion of the cooking chamber. The grate has a plurality of elongated members defining a cooking surface and multiple openings. The grate further has a grease control assembly that is cooperatively positioned over a burner flame region to direct and control the flow of grease generated by cooking food on the grate. The grease control assembly has at least one rib group and at least one ledge. The rib group comprises a plurality of ribs, each rib having a first inclined surface and a second inclined surface. The grease control assembly also has an outer ridge and an inner ridge depending from a lower surface of the grate. With these structures, the grate prevents grease and byproducts from draining onto the burner flame region.

34 Claims, 11 Drawing Sheets

U.S. PATENT DOCUMENTS

| | | |
|---|---|---|
| 3,791,370 A | 2/1974 | Fauser |
| 3,859,978 A | 1/1975 | Smith |
| 3,959,620 A | 5/1976 | Stephen, Jr. |
| 3,967,613 A | 7/1976 | Rybak et al. |
| 4,020,322 A | 4/1977 | Muse |
| 4,089,258 A | 5/1978 | Berger |
| 4,108,142 A * | 8/1978 | Barson et al. ............ 126/41 R |
| 4,140,049 A | 2/1979 | Stewart |
| 4,321,857 A | 3/1982 | Best |
| 4,453,530 A | 6/1984 | Schlosser |
| 4,463,746 A | 8/1984 | Knuth et al. |
| 4,495,860 A | 1/1985 | Hitch et al. |
| 4,512,249 A | 4/1985 | Mentzel |
| 4,574,770 A | 3/1986 | Wells |
| 4,593,676 A | 6/1986 | Wackerman |
| 4,677,964 A | 7/1987 | Lohmeyer et al. |
| RE32,754 E | 9/1988 | Hahn |
| 5,065,734 A | 11/1991 | Elliott |
| 5,167,183 A | 12/1992 | Schlosser et al. |
| 5,259,299 A * | 11/1993 | Ferraro ........................ 99/340 |
| 5,331,942 A | 7/1994 | McDonald et al. |
| D364,777 S | 12/1995 | Schlosser et al. |
| 5,490,452 A | 2/1996 | Schlosser et al. |
| 5,934,183 A | 8/1999 | Schlosser et al. |
| 5,934,184 A | 8/1999 | Schlosser et al. |
| 6,283,114 B1 | 9/2001 | Giebel et al. |
| 6,481,343 B1 | 11/2002 | Rigney et al. |

* cited by examiner

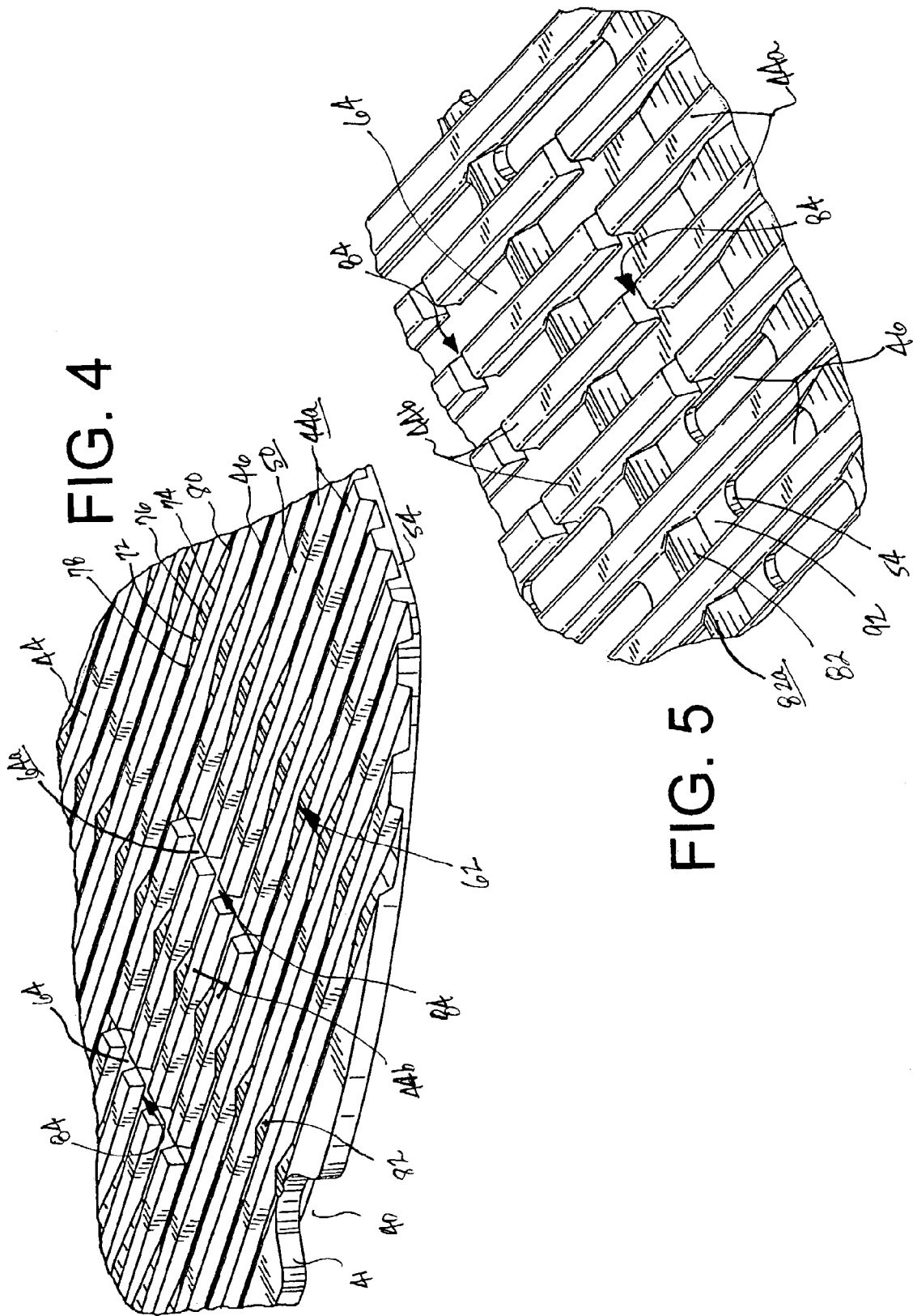

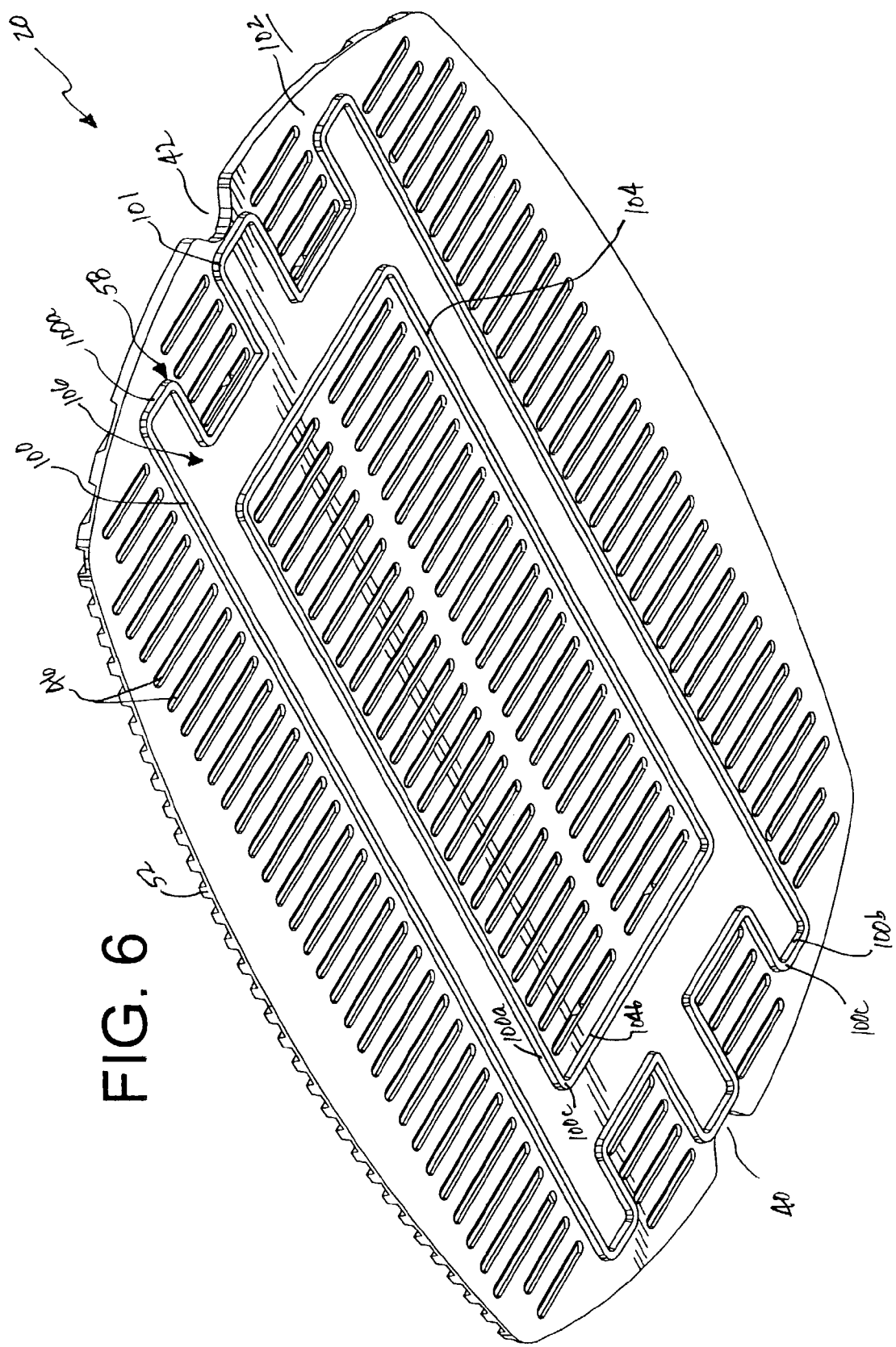

COOKING GRATE WITH GREASE CONTROL STRUCTURES

CROSS-REFERENCE TO RELATED APPLICATIONS

Not Applicable.

FEDERALLY SPONSORED RESEARCH OR DEVELOPMENT

Not Applicable.

TECHNICAL FIELD

The present invention relates to a cooking grate for use with a barbecue grill. More specifically, the present invention relates to a cooking grate having a grease control assembly to control and direct the flow of grease generated by food cooked on the grate.

BACKGROUND OF THE INVENTION

The popularity of barbecue grills and outdoor cooking devices has increased tremendously over the last twenty-five years. Gas barbecue grills employ a burner to cook food that is supported on a grate above the burner. Conversely, charcoal barbecue grills use combustible solid fuel to cook the food. Typically, the grate has numerous elongated bars and openings which cause the grate to have a grid-like configuration. Most grates are formed from metal such that the grate can withstand the high heat generated by the burner or heating element.

During operation of the barbecue grill, food is placed on the grate and grease and other byproducts are generated during the cooking process. The quantity of grease and byproducts generated during the cooking process varies with a number of factors, including but not limited to the type of food cooked on the grate, the amount of food cooked, the amount of heat generated by the burner tube, and the ambient conditions. In addition, certain types of foods produce a larger amount of grease and byproducts than other types. For example, cooking an ear of corn on the grate produces less grease and byproducts than a steak or hamburger. Grease and byproducts are generally fluid such that they flow or move in a path. The direction of the path depends upon the effects of gravity and the structures within the cooking chamber of the barbecue grill. However, over time and repeated use, grease and byproducts can accumulate on the grate and within the cooking chamber. The accumulation of grease and byproducts can negatively affect the performance and operation of the barbecue grill assembly.

Conventional grates typically include a plurality of elongated members, openings, and cross members that define a cooking surface for the food. An example of the conventional grate is found in U.S. Pat. No. 5,490,452 to Schlosser et al. There, the grate 10 is formed from a plurality of elongated rods 36 about openings, both of which are within a perimeter defined by a circular ring 20. Another example of the conventional grate is shown in U.S. Pat. No. 6,481,343 to Rigney et al. There, the grate has a generally rectangular shape with numerous openings 31 and elongated structures 28. Conventional grates suffer from an inability to direct or control the flow of grease and byproducts generated while cooking food on the grate. Instead, conventional grates merely allow grease and byproducts to pass through the various openings in a random manner without directing such passage. As a result, conventional grates cannot direct the flow of grease and byproducts away from hot burner assemblies during operation of the grill. In addition, conventional grates cannot direct the flow of grease and byproducts to an intended location for drainage or removal from the grill. Consequently, conventional grates permit the accumulation of grease and byproducts which negatively affects the performance and operation of the barbecue grill.

Therefore, there is a definite need for a grate that directs and controls the flow of grease and byproducts to ensure the long-term performance and operation of the barbecue grill. The present invention is provided to solve these and other problems.

SUMMARY OF THE INVENTION

The present invention relates to a grate for use with a barbecue grill assembly. More specifically, the present invention relates to a grate with a grease control assembly that directs the flow of grease and byproducts generated during the cooking process out of the grill assembly. The barbecue grill assembly generally includes a cooking chamber and a support frame assembly. The cooking chamber includes a cover hingeably connected to a firebox. The grate is removably positioned generally within the firebox. A burner element or tube is positioned generally within a lower portion of the firebox. The burner has a plurality of outlet ports or apertures from which a flame extends thereby defining a burner flame region. The cooking chamber does not include a sear bar or any conventional conductive metal structure between the grate and the burner. A drain opening is positioned in a bottom wall of the firebox. The drain opening is adapted to drain grease and other byproducts that are generated by cooking food in the cooking chamber that are directed to the opening by the grease control assembly. Preferably, the barbecue grill assembly has a compact configuration meaning that it is smaller than conventional upright barbecue grills. Typically, conventional barbecue grills have a greater overall height due to a frame assembly that supports the cooking chamber. In contrast, the barbecue grill assembly of the present invention can be operated while positioned on a table top.

In accord with the invention, the grate includes the grease control assembly, a plurality of elongated members or bars, and a plurality of openings. When the grate is positioned in the cooking chamber, the grease control assembly is positioned generally over the burner to prevent grease and byproducts generated by cooking food on the grate from coming into contact with the burner. The bars extend substantially from a front edge of the grate to a rear edge of the grate. Preferably, the bars are generally parallel and are spaced a distance apart to define a grid. The grate has a plurality of openings where each opening is positioned between bars.

The grease control assembly comprises an upper grease control assembly and a lower grease control assembly. The upper grease control assembly generally corresponds to the upper portion of the grate and comprises a plurality of rib groups and a plurality of ledges. Each ledge is positioned between the rib groups and near a peripheral region of the grate. The intersection of the rib groups and the ledges defines a central region of the grate. The rib groups are comprised of a plurality of ribs wherein each rib is adapted to direct or guide the flow of grease and byproducts generated while cooking food on the grate. The rib has at least one inclined surface extending from the cooking surface towards a lower edge of the rib. The rib can have a second inclined surface wherein the inclined surfaces converge to define a peak. Once grease comes into contact with the rib, grease migrates down the inclined surfaces to the edges of the rib. In this manner, the drainage of grease and byproducts occurs in a controlled and directed manner.

In further accord with the invention, the lower grease control assembly comprises an outer ridge that depends from a lower surface of the grate. The outer ridge has an outer wall, an inner wall, and a bottom wall. The lower control assembly further comprises an inner ridge that depends from the lower. The inner ridge has an outer wall, an inner wall, and a bottom wall. Preferably, neither the inner ridge nor the outer ridge intersects the openings of the grate. The outer and inner ridges depend substantially perpendicular to the lower surface of the grate. The outer ridge and the inner ridge define a cavity. The outer and inner ridges are cooperatively positioned with the upper grease control assembly. Thus, the lower grease control assembly is cooperatively positioned with the upper grease control assembly. When the grate is positioned in a use position within the cooking chamber, the grease control assembly is positioned generally above the burner tube. In the use position, ribs from the rib groups of the upper grease control assembly are positioned over a portion of the burner tube. The first surface of the rib is positioned over the intermediate and inner portions of the burner tube. The edge of the first surface extends beyond a wall of the burner tube. The second surface of the rib is positioned over the intermediate and outer portions of the burner tube. The edge of the second surface extends beyond a wall of the burner tube. The peak of the rib is positioned generally above the intermediate portion of the burner tube.

When the grate is in the use position during operation of the grill assembly, the grease control assembly directs and controls the flow of grease and byproducts to ensure the removal or drainage of the grease from the firebox. This prevents the build-up of grease and byproducts which can negatively affect the performance and operation of the barbecue grill assembly. Furthermore, the grease control assembly directs the flow path of grease such that it does not make contact with the burner tube during operation of the barbecue grill assembly.

Other features and advantages of the invention will be apparent from the following specification taken in conjunction with the following drawings.

BRIEF DESCRIPTION OF THE DRAWINGS

FIG. 4 is a partial perspective view of the grate of FIG. 1, showing a top portion of the grate;

FIG. 5 is a partial perspective view of the grate of FIG. 1, showing a top portion of the grate;

FIG. 6 is a bottom perspective view of the grate of FIG. 1;

DETAILED DESCRIPTION OF THE INVENTION

Figure 1:
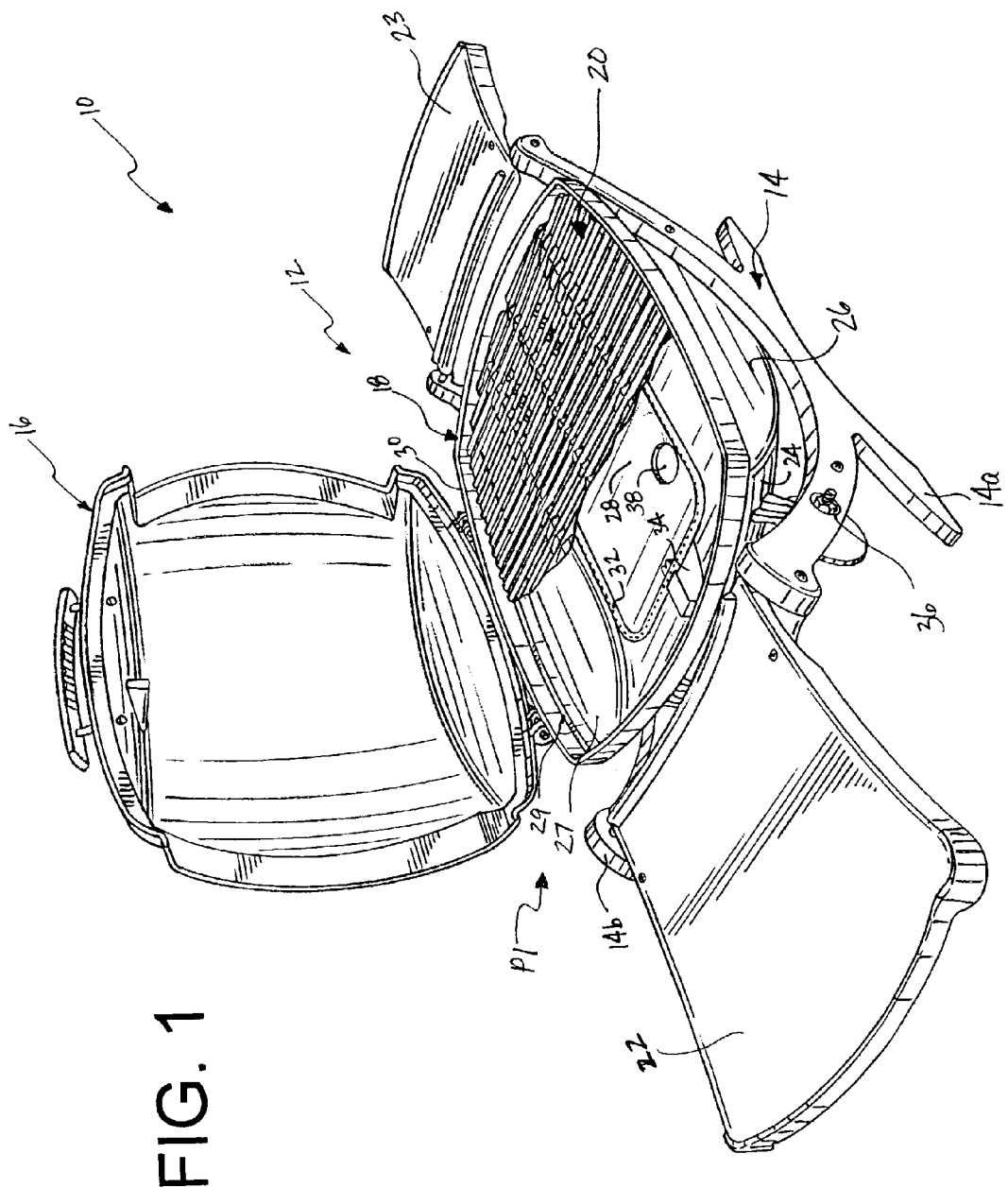
FIG. 1 is a perspective view of a barbecue grill assembly showing a grate of the invention.

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

A barbecue grill assembly 10 is shown in FIG. 1. The barbecue grill assembly 10 generally includes a cooking chamber 12 and a support frame assembly 14. The support frame assembly 14 is adapted to provide support to the cooking chamber 12 and has a front structure 14a and a rear structure 14b. The cooking chamber 12 includes a cover 16 hingeably connected to a firebox 18. A grate 20 is positioned generally within the firebox 18. As explained below, the grate 20 has a grease control assembly 21 that directs and controls the flow of grease and byproducts generated by cooking food on the grate 20. The barbecue grill assembly 10 further includes a first work surface 22 and a second work surface 23, each pivotally connected to a portion of the support frame assembly 14. The firebox 18 has an interior geometry or configuration defined by a first side wall 24, a second side wall 25, a front wall 26, a rear wall 27, and a bottom wall 28. As shown in FIG. 1, the side walls 26, 27 and the bottom wall 28 have a sloped or curved configuration. A ledge 29 is positioned along the interior portion of the firebox 18. The ledge 29 is adapted to support the grate 20 in a generally horizontal position below a rim 30 of the firebox 18. Alternatively, the ledge 29 is omitted and the firebox 18 has a plurality of individual structures to support the grate 20. The barbecue grill assembly 10 has a compact configuration meaning that its overall height is less than that of conventional upright barbecue grills. As a result, the barbecue grill assembly 10 is capable of operation while positioned on a table top. Furthermore, the barbecue grill assembly 10 is sized such that it can be lifted by a single user and carried between locations for use.

A burner element 32 is positioned generally within a lower portion of the firebox 18 of the cooking chamber 12. In other words, the burner element 32 is positioned below the grate 20. In contrast to conventional barbecue grill assemblies, the cooking chamber 12 lacks a sear bar or conductive metal structure positioned between the burner element 32 and the grate 20. In a conventional barbecue grill, sear bars and conductive structures are adapted to shield the burner from grease dripping from the grate. The conductive structures are usually metal structures or an arrangement of heat conductive lava racks. Since the grate 20 has a grease control assembly 21, sear bars and/or conductive structures are not required in the grill assembly 10. As shown in the figures, the burner element 32 is preferably a burner tube or loop. However, a conventional linear or H-shaped burner can be employed in the barbecue grill assembly 10. A portion of the burner 32 is supported within the firebox 18 by a block 34 extending from the first side wall 24. The burner 32 has a plurality of linear, curvilinear, and transition segments resulting in a continuous configuration. The burner 32 has a geometry or configuration similar to the interior geometry of the firebox 18 such that the burner tube 32 is capable of being received by the firebox 18. Preferably, the burner 32 is a cylindrical element with a circular cross-section with an inner wall diameter and an outer wall diameter. An inlet portion of the burner 32 extends through an opening 35 (see FIG. 8) of the second side wall 25 and is connected to a fuel source (not shown) to define a pathway for flow of the fuel. The burner tube 32 has a plurality of outlet ports or apertures 33 from which a flame extends thereby defining at least one burner flame region. The burner flame region is a region of the burner tube 32 defined by at least one outlet port 33 through which a flame extends during operation of the grill assembly 10. Preferably, a plurality of outlet ports 33 define the burner flame region. Although shown in FIGS. 1 and 2 as having a generally rectangular configuration, the configuration of the burner flame region varies with the design parameters of the burner element 32, including the positioning of the outlet ports 33. An ignitor button 36 extends from the front structure 14a of the support assembly 14 and is used to ignite fuel that flows through the burner 32.

A drain opening 38 is positioned in the bottom wall 28 of the firebox 18. The drain opening 38 is adapted to drain grease and other byproducts that are generated by cooking food on the grate 20 and that are directed to the opening 38 by the grease control assembly 21. Described in a different manner, the drain opening 38 functions as a passageway for the removal or drainage of grease and byproducts from the cooking chamber 12. Due to the grease control assembly 21 and the curved or inclined configuration of the walls 24, 25, 26, 27, and 28, grease and byproducts flow or migrate to the drain opening 38.

Figure 2:
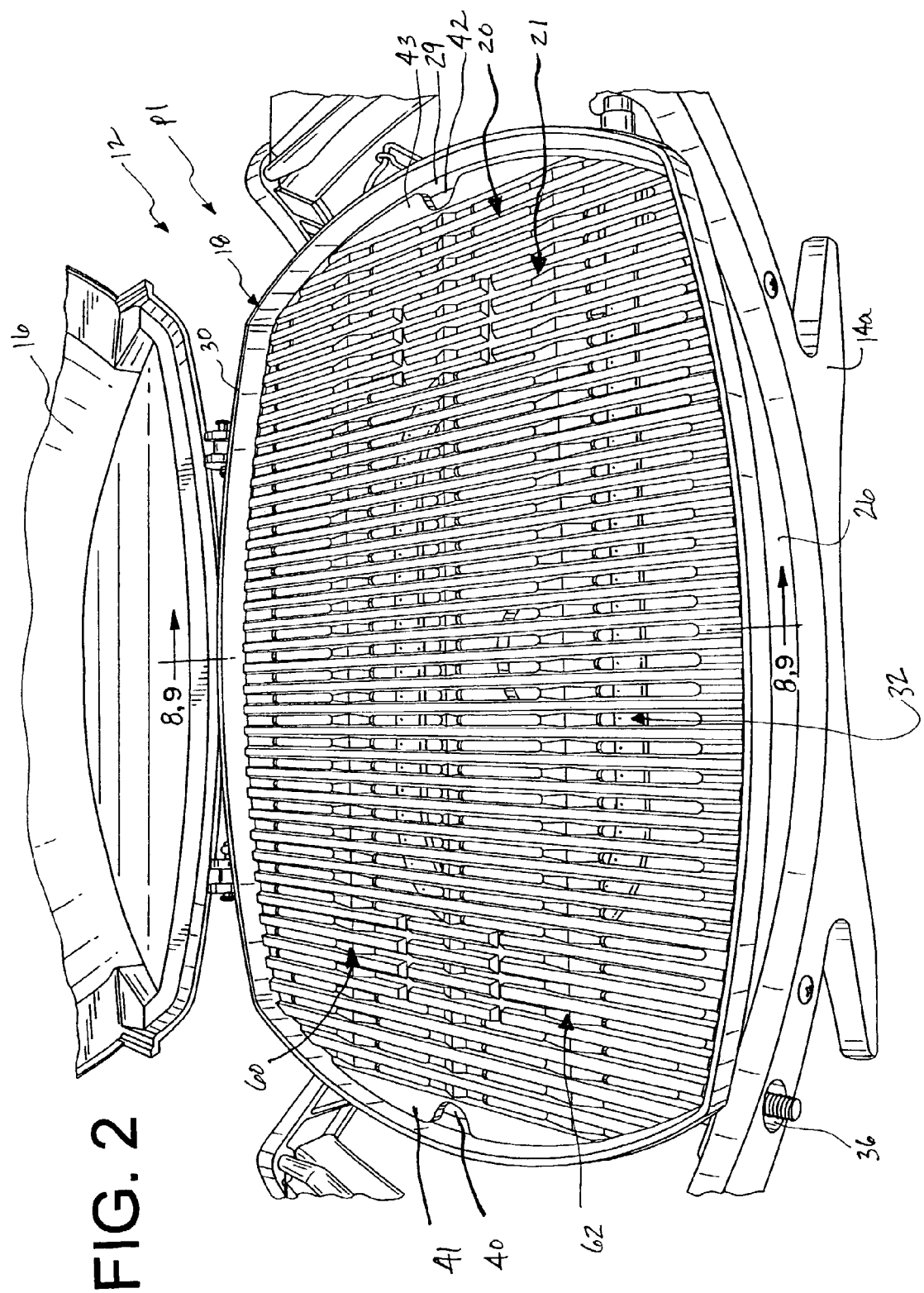
FIG. 2 is a partial front view of the grill assembly and the grate of FIG. 1.
Figure 3:
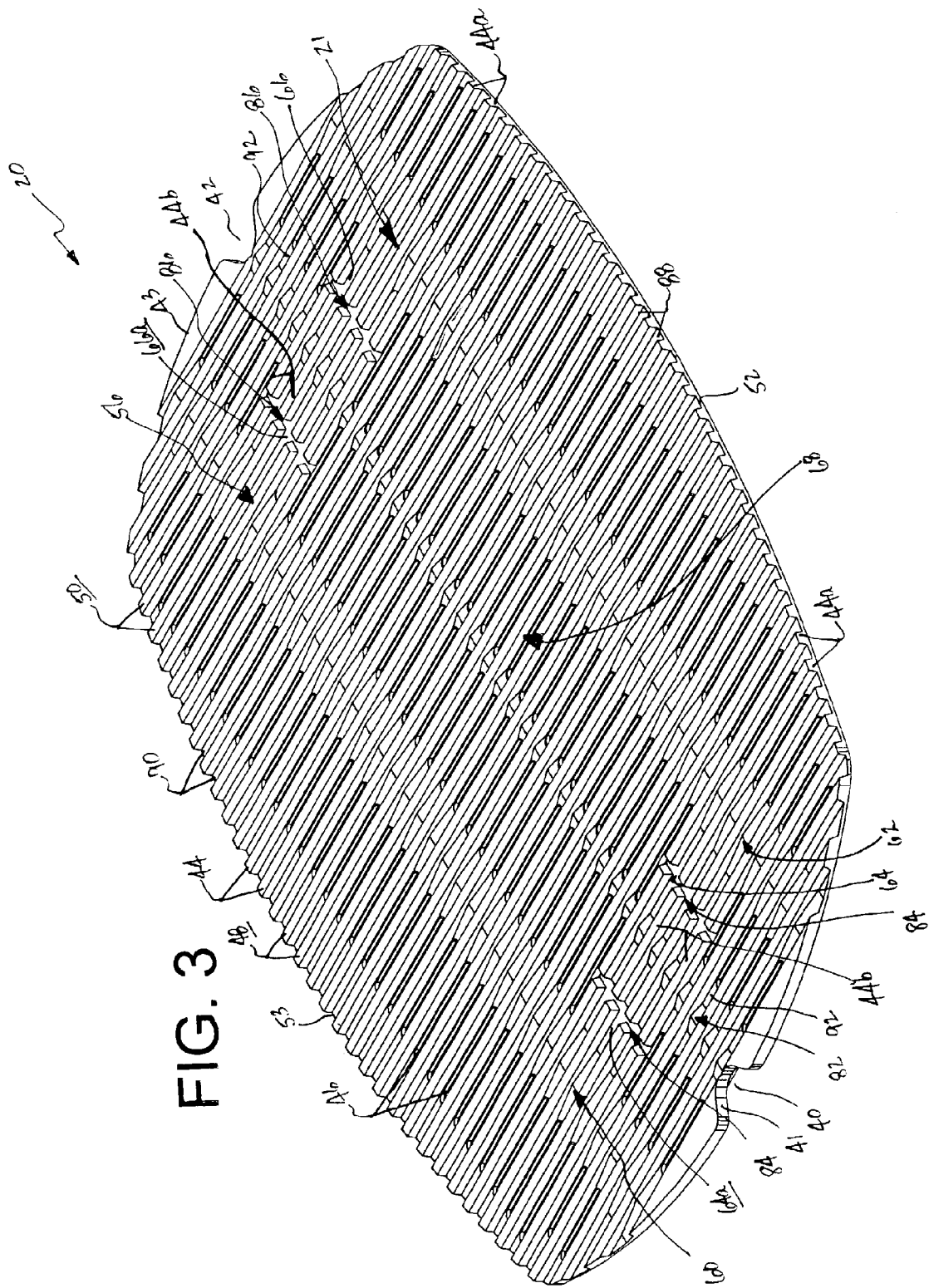
FIG. 3 is a top perspective view of the grate of FIG. 1.

As shown in FIGS. 1–3, the grate 20 is cooperatively dimensioned with an upper portion of the firebox 18. The grate 20 includes a first recess 40 proximate a first end 41 of the grate 20, and a second recess 42 proximate a second end 43 of the grate 20. The recesses 40, 42 are adapted to allow a user to grasp the grate 20 such that it can be removably positioned within the firebox 18. Referring to FIGS. 2 and 3, the grate 20 includes the grease control assembly 21, a plurality of elongated members 44, and a plurality of openings 46. When the grate 20 is positioned in the cooking chamber 12, the grease control assembly 21 is positioned generally over the burner tube 32 to prevent grease and byproducts generated by cooking food on the grate 20 from coming into contact with the burner tube 32. Each elongated member or bar 44 has an upper surface 48 wherein a plurality of upper surfaces 48 define a cooking surface 50 of the grate 20. The cooking surface 50 is adapted to receive food to be cooked on the grate 20. The cooking surface 50 has a generally rectangular configuration, however, the configuration varies with the configuration of the grate 20 and the bars 44. The bars 44 extend substantially from a front edge 52 of the grate 20 to a rear edge 53 of the grate 20. Preferably, the bars 44 are generally parallel and are spaced a distance apart to define a grid.

As stated above, the grate 20 has a plurality of openings 46 wherein an opening 46 is positioned between bars 44. The exact number of openings 46 varies with the design parameters of the grate 20. The size or length of the opening 46 varies depending upon its location in the grate 20. For example, an opening 46 in a central region of the grate 20 is larger than an opening 46 in a peripheral region of the grate 20. Although shown as having a generally elongated configuration, the shape of the openings 46 varies with the design parameters of the grate 20. For example, the openings 46 have a rounded edge 54 (see FIG. 7), however, the edge 54 can be linear or jagged. The opening 46 has a length L and a width W which defines the area (area=W×L) of the opening. The grate 20 has a total area opening $A_O$, which is the sum of the area of all the openings 46. The grate 20 has a width W and a length L that defines a total area $A_G$, which is the area of the grate 20. In addition, the grate 20 has a ratio R defined as the ratio between the total area opening $A_O$ versus the total grate area $A_G$. The grate 20 has a ratio R of approximately 0.25, however, the ratio R can range from 0.20–0.30 depending upon a number of factors, including the size of the grate 20 and the number and size of the openings 46.

Referring to FIGS. 3–5, the grease control assembly 21 comprises an upper grease control assembly 56 and a lower grease control assembly 58. The upper grease assembly 56 generally corresponds to the upper portion of the grate 20 and comprises a first rib group 60, a second rib group 62, a first ledge 64, and a second ledge 66. The first and second rib groups 60, 62 are longitudinal structures that are positioned between the first and second end 41, 43 of the grate 20. Described in a different manner, the first and second rib groups 60, 62 extend substantially the length of the grate 20. When viewed from above, the first and second rib groups 60, 62 have a discontinuous configuration due to the elongated members 44 that are positioned generally perpendicular to the groups 60, 62. The intersection of the first rib group 60, the second rib group 62, and the ledges 64, 66 defines a central region 68 of the grate 20. As shown in FIG. 3, the central region 68 has a generally rectangular configuration.

The first and second rib groups 60, 62 of the upper grease control assembly 56 are comprised of a plurality of ribs 70. Each rib 70 is adapted to direct or guide the flow of grease and byproducts generated while cooking food on the grate 20. As shown in FIG. 4, the rib 70 has a first inclined surface 72 and a second inclined surface 74. The inclined surfaces 72, 74 converge to define a peak 76. Although the peak 76 of the rib 70 is shown positioned below the upper surface 50 of the elongated member 44, the rib 70 can be configured such that the peak 76 is coplanar with or above the upper surface 50. The first surface 72 has an edge 78 and the second surface 74 has an edge 80, wherein each edge 78, 80 is adjacent an opening 46. Once grease comes into contact with the rib 70, grease migrates down the inclined surfaces 72, 74 to the edges 78, 80 of the rib 70. In this manner, the drainage of grease and/or byproducts occurs in a controlled and directed manner. The slope or pitch of the inclined surfaces 72, 74 varies with the design parameters of the grease control assembly 21. When viewed from the side, an upper portion of the rib 70 has a generally triangular shape, however, the rib 70 can have a rounded or bulbous configuration provided that the rib 70 remains adapted to direct the flow of grease and byproducts. Alternatively, the rib 70 has only a first inclined surface 72 such that the rib 70 has a ramp-like configuration wherein the surface 72 extends from the cooking surface 50 towards the side wall 24, 25 or the bottom wall 28 of the cooking chamber 18. The first inclined surface 72 is oriented to direct the flow of grease and byproducts away from or towards the central region 68 of the grate 20. The first and second rib groups 60, 62 are positioned about a spine 82 of the grate 20 that generally bisects the central region 68. Similar to the first and second rib groups 60, 62, the spine 82 has a discontinuous configuration. The spine 82 has a peak 82a (see FIG. 5) that is preferably positioned below the upper surface 50 of each elongated member 44. Alternatively, the spine 82 is omitted wherein the central region 68 has one row of openings 46, not the two rows of openings 46 shown in FIG. 3.

As discussed above, the grease control assembly 21 comprises a pair of opposed ledges 64, 66. Referring to FIGS. 3–5, each ledge 64, 66 is positioned between the first and second rib groups 60, 62 and near a peripheral region of the grate 20. A peripheral set of elongated bars 44a are discontinuous thereby forming intermediate bars 44b. The ledge 64, 66 is proximate the intermediate bars 44b. Described in a different manner, each ledge 64, 66 is positioned at the base of the intermediate bars 44b. Each ledge 64, 66 has a surface 64a, 66a that is positioned below the upper surface 50 of the elongated members 44. Although the ledge surface 64a, 66a is shown as planar, the surface 64a, 66a can be inclined or sloped. The first ledge 64 has a pair of channels 84 between the elongated bars 44a and the intermediate bars 44b. Alternatively, a single channel 84 is positioned between the peripheral bars 44a thereby eliminating the intermediate bars 44b. The second ledge 66 also has a pair of channels 86 between the elongated bars 44a and the intermediate bars 44b.

As shown in FIG. 3, the grate 20 further includes a front external ledge 88 and a rear external ledge 90. The front external ledge 88 is positioned proximate the front edge 52 and the rear external ledge 90 is positioned proximate the rear edge 53. The first and second external ledges 88, 90 are discontinuous due to the plurality of elongated bars 44. The first and second external ledges 88, 90 extend substantially the length of the grate 20. Preferably, the external ledges 88, 90 are positioned parallel to and below the cooking surface 50. Preferably, the external ledges 88, 90 are coplanar, however, the external ledges 88, 90 can be inclined to direct the drainage of grease and byproducts generated by cooking food on the grate 20. The width of the first and second external ledges 88, 90 varies along the length of the front and rear edges 52, 53. Referring to FIGS. 3 and 5, the grate 20 further includes a series of lands 92 wherein each land 92 is positioned about the central spine 82 between the intermediate bars 44b and the recess 40, 42. The lands 92 are preferably parallel to the cooking surface 50, however, the lands 92 can be inclined to direct the drainage of grease and cooking byproducts.

Figure 7:
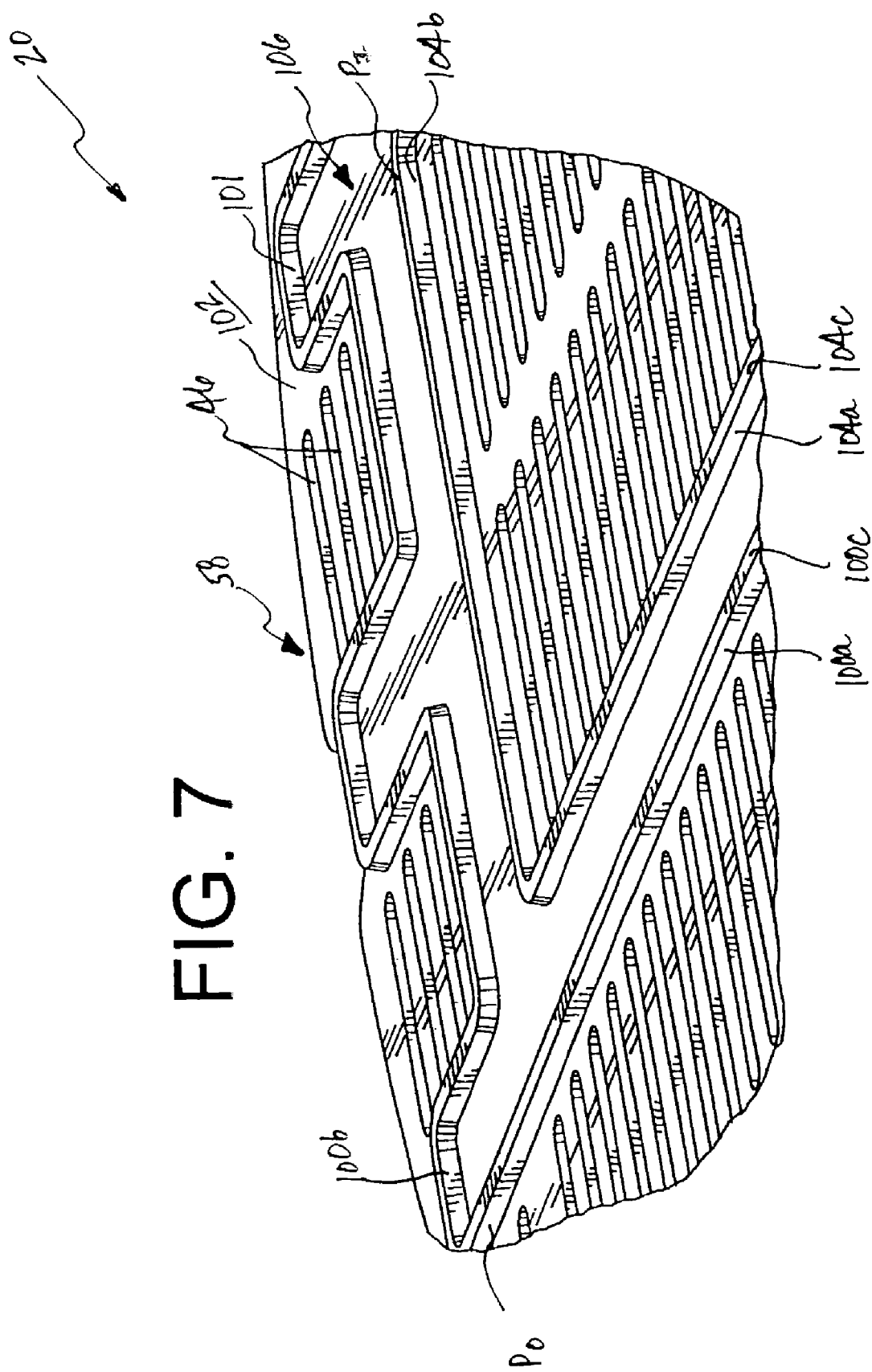
FIG. 7 is a partial perspective view of the grate of FIG. 1, showing an bottom portion of the grate.
Figure 9:
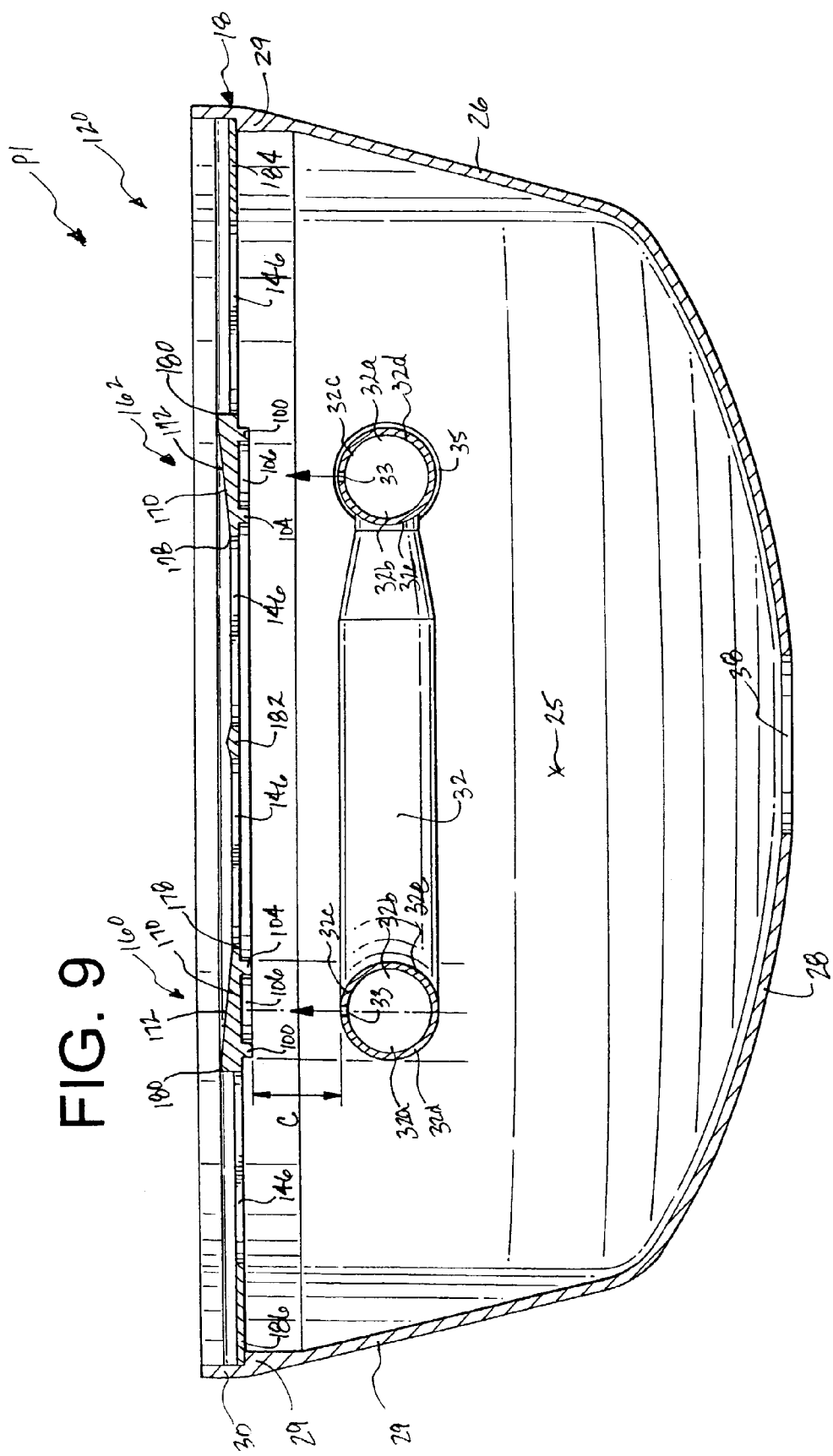
FIG. 9 is a cross-section of the grill assembly and an alternate embodiment of the grate taken along line 9—9 of FIG. 2.

As discussed above, the grease control assembly 21 of the grate 20 includes the upper grease control assembly 56 and the lower grease control assembly 58. Similar to the upper grease control assembly 56, the lower grease control assembly 58 is adapted to direct the flow of grease and byproducts generated by cooking food on the grate 20. Referring to FIGS. 6–7, lower grease control assembly 58 comprises an outer or first ridge 100 that depends from a lower surface 102 of the grate 20. The outer ridge 100 has an outer wall 100a, an inner wall 100b, and a bottom wall 100c. Each of the walls 100a, 10b, 100c have a generally smooth surface. The outer ridge 100 has a plurality of linear and curvilinear segments. In addition, the outer ridge 100 has a plurality of protrusions 101. The lower control assembly 58 further comprises an inner ridge 104 that depends from the lower surface 102. The inner ridge 104 has an outer wall 104a, an inner wall 104b, and a bottom wall 104c. Each of the walls 104a, 104b, 104c have a generally smooth surface. Also, the inner ridge 104 has a plurality of linear and curvilinear segments. Preferably, neither the inner ridge 100 nor the outer ridge 104 intersects the openings 46 of the grate 20. The outer and inner ridges 100, 104 depend substantially perpendicular to the lower surface 102 of the grate 102. Alternatively, the outer ridge 100 and/or the inner ridge 104 depend at an angle from the lower surface 102. Referring to FIG. 9, the outer ridge 100 has a height $H_O$, a width $W_O$, and a perimeter $P_O$. Similarly, the inner ridge 104 has a height $H_I$, a width $W_I$, and a perimeter $P_I$ with a generally rectangular configuration.

The outer ridge 100 and the inner ridge 104 define a cavity 106. Like the inner and outer ridges 100, 104, the cavity 106 has a plurality of linear and curvilinear segments. Preferably, the cavity 106 does not intersect the openings 46 of the grate 20. The outer and inner ridges 100, 104 are cooperatively positioned with the upper grease control assembly 56. Specifically, the outer ridge 100 is cooperatively positioned with the periphery of the first and second rib groups 60 and the ledges 64, 66. Also, the inner ridge 104 is cooperatively positioned with the inner bounds of the first and second rib groups 60, 62 and the ledges 64, 66. Thus, the cavity 106 is generally positioned between the bounds of the first and second rib groups 60, 62 and the ledges 64. As a result, the lower grease control assembly 58 is cooperatively positioned with the upper grease control assembly 56.

Figure 8:
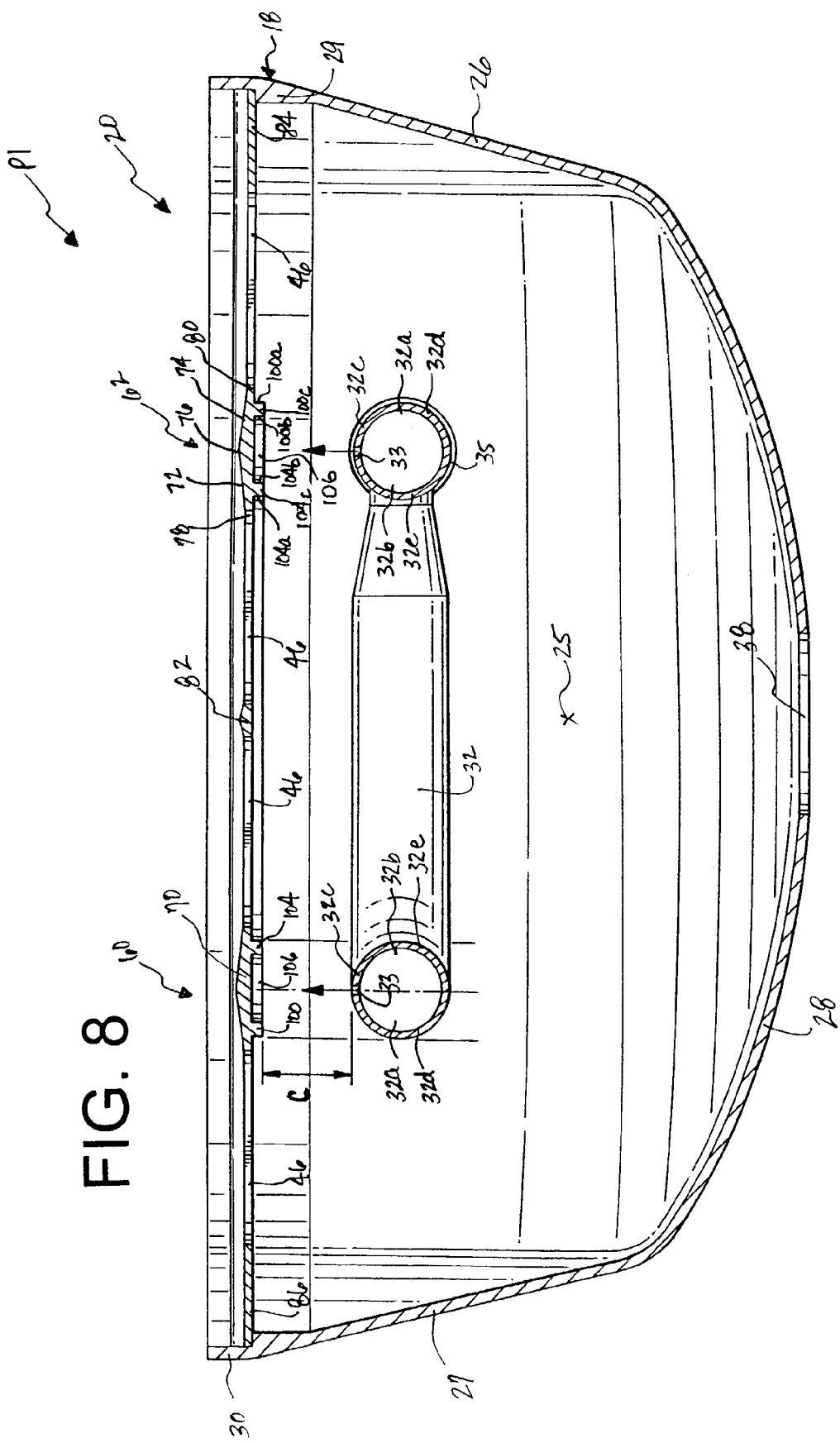
FIG. 8 is a cross-section of the grill assembly and the grate taken along line 8—8 of FIG. 2.

As shown in FIGS. 1 and 2, when the grate 20 is positioned within the cooking chamber 12, the grease control assembly 21 is positioned generally above the burner 32. Since the cooking chamber 12 lacks a conventional sear bar or conductive metal structure, there is no structure positioned directly between the grate 20 and the burner 32. As explained in greater detail below, the grease control assembly 21 directs and controls the flow of grease generated by cooking food on the grate 20 in controlled maimer such that the grease avoids contact with the burner 32 and exits the cooking chamber 12 through the drain opening 38. FIG. 8 depicts the grate 20 positioned within the cooking chamber 12 to define a use position P1. Therein, the grate 20 is supported in an elevated position above the burner 32 by engagement between the edges 52, 53 of the grate 20 and the ledge 29 of the firebox 18. In the use position P1, the grease control assembly 21 is positioned generally above an the burner 32. Described in a different manner, the burner 32 is below the grease control assembly 21 of the grate 20. Since the burner 32 of FIGS. 1 and 2 has a loop configuration, the grease control assembly 21 is positioned above both linear and curvilinear segments of the burner 32. Preferably neither the external ledges 88, 90 nor the openings 46 of the grate 20 are aligned over the burner tube 32.

In the use position P1, the lower grease control assembly 58 is positioned above the burner tube 32 to define a clearance C. The clearance C represents the vertical distance between an upper surface of the burner tube 32 and a lower surface of the lower grease control assembly 58. The amount of the clearance C varies with the design parameters of the grill assembly 10, including the grate 20, the firebox 18, and the burner tube 32. In the use position P1 of FIG. 8, the outer ridge 100 is generally positioned over an outer portion 32a of the burner tube 32. Specifically, the outer wall 100a is positioned beyond the outer portion 32a, the inner wall 100b is positioned over the outer portion 32a, and the bottom wall 100c is positioned over the outer portion 32a(see FIG. 10). Described in a different manner, the outer wall 100a extends beyond the outer wall 32d of the burner tube 32 such that the outer wall 100a is not aligned with the outer wall 32d of the burner tube 32. Described in yet another manner, the surface of the outer wall 100a defines a plane that lies beyond the plane defined by the outer wall 32d of the burner tube 32. Alternatively, the lower grease control assembly 58 is configured such that the inner wall 100b extends beyond the outer wall 32d of the burner tube 32. As a result, the surface of the inner wall 100b defines a plane that lies beyond the plane defined by the outer wall 32d. In the use position P1, the inner ridge 104 is generally positioned over an inner portion 32*b* of the burner tube 32. Specifically, the outer wall 104*a* is positioned beyond the inner portion 32*b*, the inner wall 104*b* is positioned over the inner portion 32*b*, and the bottom wall 104*c* is positioned over the inner portion 32*b*. Described in a different manner, the outer wall 104*a* extends beyond the inner wall 32*e* of the burner tube 32 such that the outer wall 104*a* is not aligned with the inner wall 32*e* of the burner tube 32. Described in yet another manner, the surface of the outer wall 104*a* defines a plane that lies beyond the plane defined by the inner wall 32*e* of the burner tube 32. Alternatively, the lower grease control assembly 58 is configured such that the inner wall 104*b* extends beyond the inner wall 32*e* of the burner tube 32. As a result, the surface of the inner wall 104*b* defines a plane that lies beyond the plane defined by the inner wall 32*e*.

In the use position P1, the cavity 106 is generally positioned over an intermediate portion 32*c* of the burner tube 32, which contains the outlet ports that a flame extends from during operation of the barbecue grill assembly 10. This means that the cavity 106 is generally positioned over the burner flame region of the burner 32. Preferably, the cavity 106 is cooperatively dimensioned with at least the burner flame region. Alternatively, the cavity 106 has a configuration that is substantially similar to the configuration of the burner 32 such that the cavity 106 remains positioned over the burner flame region. In the event that the cavity 106 is omitted from the lower grease control assembly 58 and there is a generally continuous wall spanning the inner and outer ridges 100, 104, the outer walls 100*a*, 104*a* remain positioned beyond the outer and inner walls 32*d*, 32*e* of the burner 32.

In the use position P1, the upper grease control assembly 56 is positioned above an extent of the burner tube 32. As shown in FIG. 8, a rib 70 of the first rib group 60 is positioned over a portion of the burner tube 32. Similarly, a rib 70 of the second rib group 62 is positioned over a portion of the burner tube 32. In the use position P1, the first surface 72 of the rib 70 is positioned over the intermediate and outer portions 32*a*, 32*c* of the burner tube 32 (see FIG. 10). However, the edge 78 of the first surface 72 extends beyond the outer portion 32*a*. Described in a different manner, the edge 78 extends beyond the outer wall 32*d* of the burner tube 32. The second surface 74 of the rib 70 is positioned over the intermediate and inner portions 32*b*, 32*c* of the burner tube 32, however, the edge 80 of the second surface 74 extends beyond the inner portion 32*b*. Described in a different maimer, the edge 80 extends beyond the inner wall 32*e* of the burner tube 32. The peak 76 of the rib 70 is positioned generally above the intermediate portion 32*c* of the burner tube 32. The degree or amount that the edges 78, 80 extend past the walls of the burner tube 32 varies with the design parameters of the grill assembly 10, including the grate 20, the grease control assembly 21, and the burner tube 32.

FIG. 9 depicts another embodiment of the grate 120 wherein the grease control assembly 121 has a geometry distinct from that shown in FIG. 8. The upper grease control assembly 56 of the grease control assembly 121 has first and second rib groups 160, 162 with a unique rib 170 configuration. Specifically, the rib 170 has a single inclined surface 172 and not a plurality of inclined surfaces. The inclined surface 172 extends from the cooking surface 50 towards a lower portion of the cooking chamber 18. The inclination of the rib 170 begins at an internal edge 178 and terminates at an external edge 180. Alternatively, the inclination of the rib 170 begins at the external edge 180 and terminates at the internal edge 178. The slope or degree of inclination of the rib 170 can vary with the design parameters of the grease control assembly 121, including the design of the first rib group 160 and the second rib group 162. In the use position P1, the internal edge 178 extends beyond the internal portion 32*b* and the inner wall 32*e* of the burner tube 32. Also, the external edge 180 extends beyond the external portion 32*a* and the outer wall 32*d* of the burner tube 32.

During operation of the barbecue grill assembly 10, food is placed on the grate 20 and grease and other byproducts are generated during the cooking process. The quantity of grease and byproducts generated during the cooking process varies with a number of factors, including but not limited to the type of food cooked on the grate 20, the amount of food cooked, the amount of heat generated by the burner tube 32, and the ambient conditions. In addition, certain types of foods produce a larger amount of grease and byproducts than other types. For example, cooking a steak or hamburger generally more grease and byproducts than an ear of corn or baked potato. Over time and repeated use, grease and byproducts can accumulate and negatively affect the performance and operation of the barbecue grill assembly 10. However, grease and byproducts are generally fluid such that they flow or move in a path, primarily due to the effects of gravity. Thus the effective removal of grease and byproducts is an important aspect of the barbecue grill assembly 10.

The grate 20 directs and controls the flow of grease and byproducts to ensure the long-term performance and operation of the barbecue grill assembly 10. Typically, uncooked food is placed on the grate 20 which may have already been heated by flames exiting the burner tube 32. As the temperature of the grate 20 and the food increases, grease and other byproducts are generated. Since the food is in direct contact with the grate 20, a measurable quantity of grease comes into contact with various portions of the grate 20. A first quantity of the grease comes into contact with at least one opening 46 of the grate 20, and a second quantity of the grease comes into contact with the grease control structure 21 of the grate 20. When the first quantity of grease comes into contact with an opening 46, the grease generally flows through the opening 46 and to the bottom wall 28 of the firebox 18 (see FIG. 8). Since the bottom wall 28 is downwardly sloped, the majority of the grease drains or passes through the drain 38. Because the openings 46 of the grate 20 are not positioned above the burner tube 32, grease that flows through the openings 46 does not make direct contact with the burner tube 32. Described in a different manner, grease that comes into contact with the openings 46 flows to the bottom wall 28 because the burner tube 32 does not obstruct such flow.

While the first quantity of grease comes into contact with the openings 46, the second quantity of grease comes into contact with the grease control structure 21. Referring to the schematic view of FIG. 10, grease comes into contact with a portion of the rib 70 and flows along the rib 70 to define a flow path FP whereby the grease is directed away from contact with the burner tube 32. Typically, grease first comes into contact with the first inclined surface 72 at an upper portion of the surface 72 near the peak 76. The point where grease first contacts the inclined surface 72 defines the beginning or first point FP1 of the flow path FP. Due to the inclined configuration of the rib 70, the flow path FP of grease continues along the surface 72 until it reaches the edge 78. There, the flow path FP experiences a change in direction due to the change in geometry of the rib 70. The point where the flow path FP changes direction occurs proximate the edge 78 and defines a second point FP2 of the flow path FP. Due to the effects of gravity and the geometry of the rib 70 at the edge 78, a first amount of grease in the flow path FP loses contact with the rib 70 and this amount of grease passes or drops to the bottom wall 28 of the firebox 18. Since the edge 78 extends beyond the outer wall 32*d* of the burner tube 32, this amount of grease does not contact the burner 32 as it drains to the bottom wall 28. A second amount of grease ill the flow path FP continues along the lower surface 102 of the grate 20 until it reaches the outer wall 100*a* of the outer ridge 100. There, this amount of grease in the flow path FP experiences another change in direction due to the variation in geometry between the lower surface 102 and the outer ridge 100. The point where the flow path FP changes direction occurs near where the lower surface 102 meets the outer wall 100*a* of the outer ridge 100 and defines a third point FP3 of the flow path FP. The flow path FP of the grease continues along the outer wall 100*a* until it reaches the lower edge where the outer wall 100*a* meets the bottom wall 100*c*. There, due to the effects of gravity and the geometry of the outer wall 100*a*, the second amount of grease in the flow path FP loses contact with the rib 70 and this amount of grease passes or drops to the bottom wall 28 of the firebox 18. The point where the grease loses contact with the outer wall 100*a* defines a fourth point FP4 of the flow path FP. Since the outer wall 100*a* of the outer ridge 100 extends beyond the outer wall 32*d* of the burner tube 32, grease does not contact the burner tube 32 as it drains to the bottom wall 28. Thus, the grate 20 provides the flow path FP for grease and byproducts generated during the cooking process whereby the flow path FP precludes the grease and byproducts from contacting the burner tube 32. The precise direction of the flow path FP is determined by the structural aspects of the grease control assembly 21 of grate 20, including the various components of the upper and lower grease control assemblies 56, 58.

Preferably, a protective coating is applied to the grate 20 to increase the longevity and corrosion resistance of the grate 20. In addition, the protective coating increases the non-stick properties of the grate 20. In this manner, the protective coating reduces the adhesion between food and the cooking surface 50 of the grate 20. The protective coating is applied to an upper portion of the grate 20, including the elongated member 44 and the upper grease control assembly 56. Also, the protective coating can be applied to the lower grease control assembly 58. The protective coating can be a porcelain coating or another commercially available non-stick coating such as a teflon-based coating. Alternatively, the grate 20 can be plated with nickel or chrome to increase the longevity, corrosion resistance, and/or non-stick properties of the grate 20.

Figure 10:
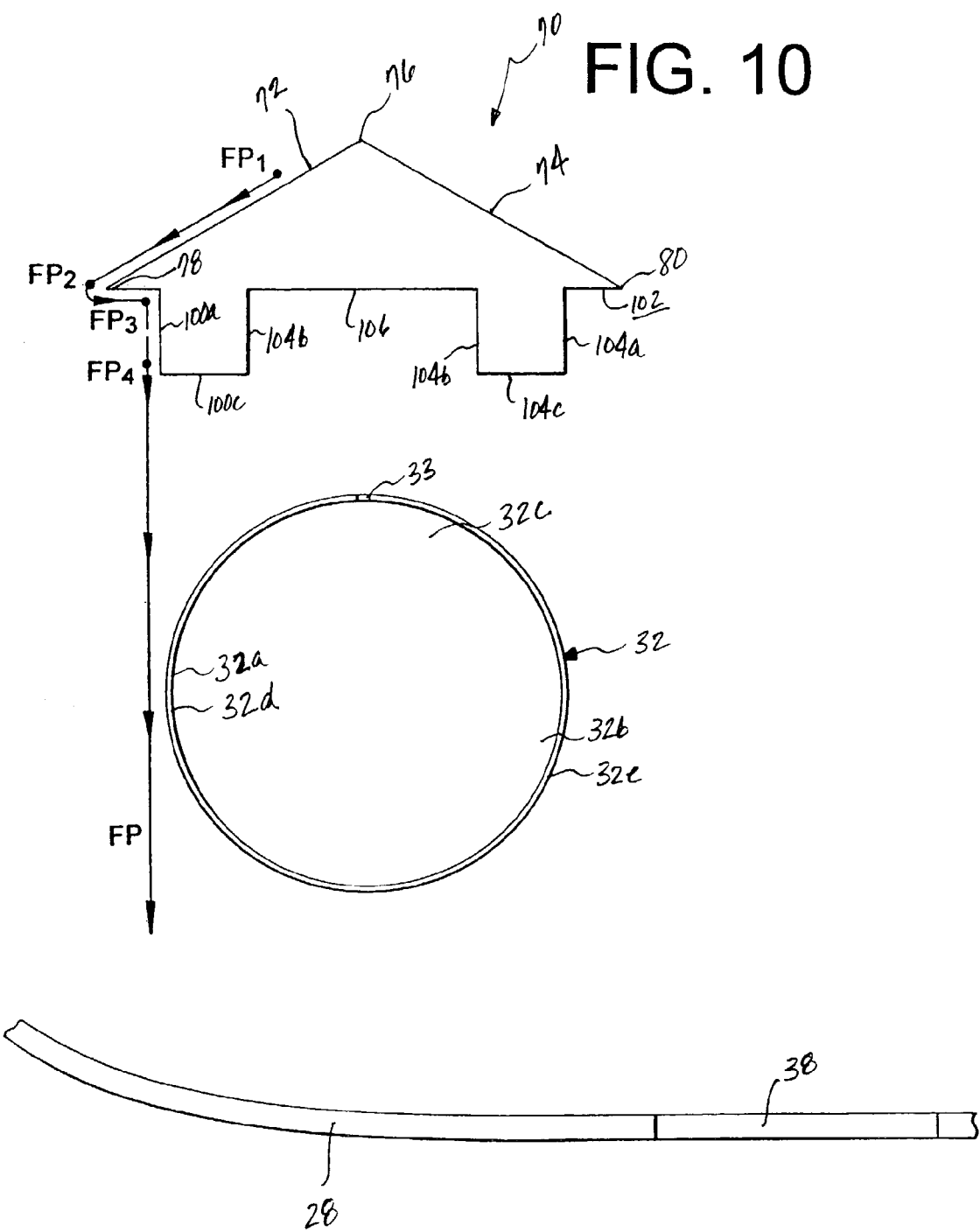
FIG. 10 is a schematic view of the operation of the grill assembly and the grate of FIG. 1.
Figure 11:
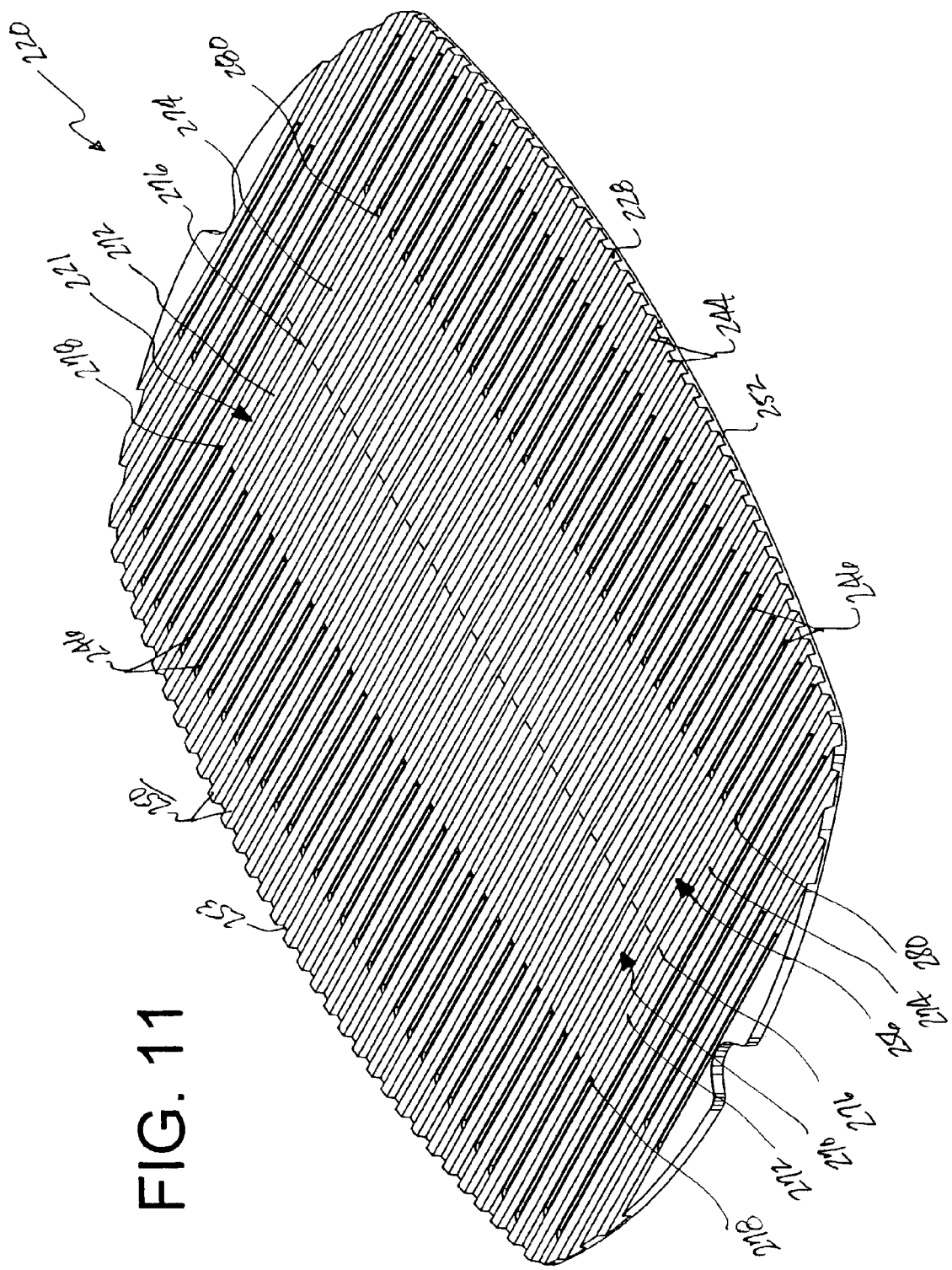
FIG. 11 is a top perspective view of an alternate embodiment of the grate.
Figure 12:
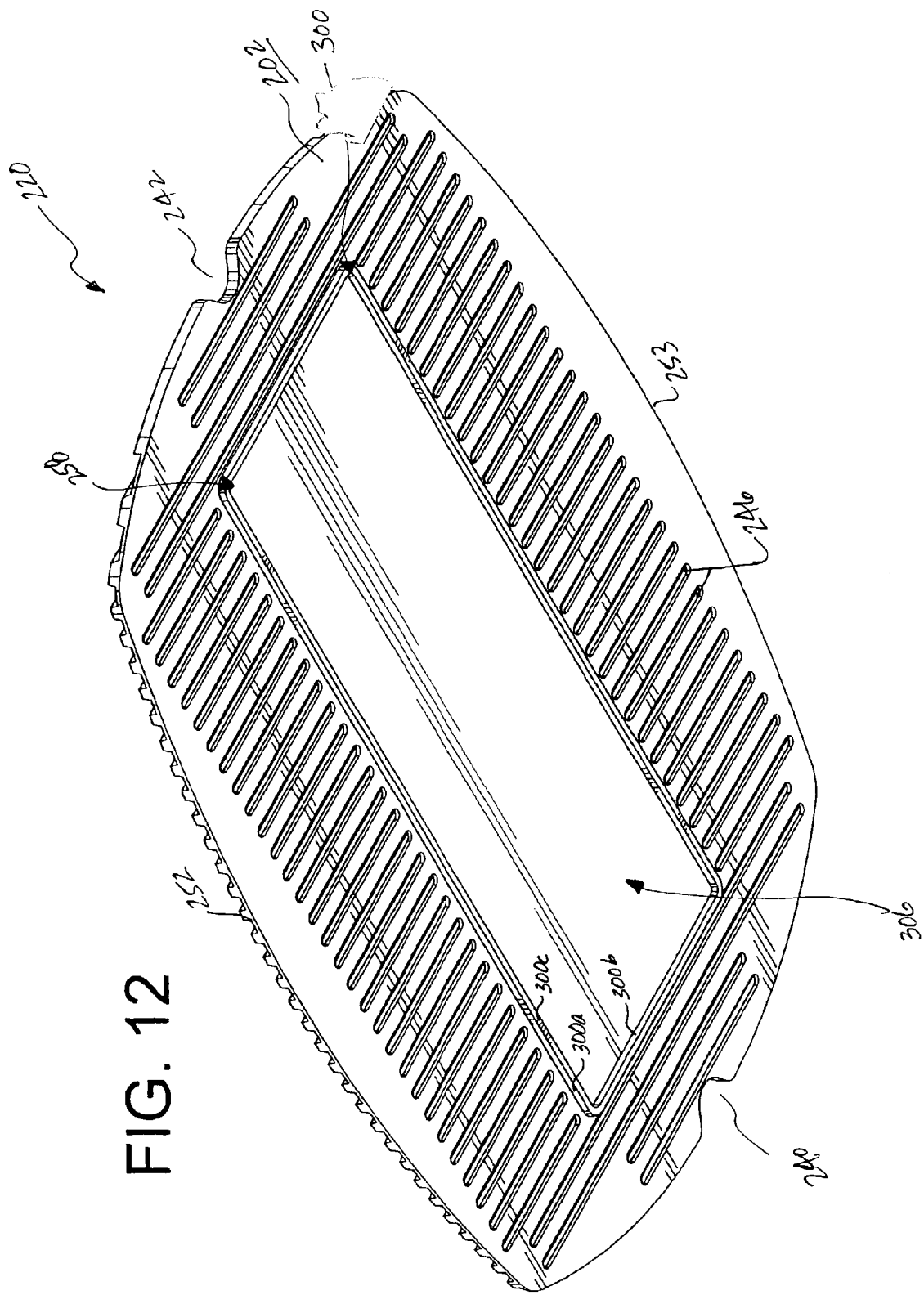
FIG. 12 is a bottom perspective view of the grate of FIG. 11.

The grate 20 of the present invention can be formed by a number of ways, including pressed, cast, or stamped. The grate 20 can be formed in a hybrid manner combining one or more methods. For example a first portion of the grate 20 can be stamped and combined with a second portion that was formed from wire or wiring. The grate 20 can be formed from a number of materials such as steel, including low or high alloys, or iron. Alternatively, the grate 20 can be formed from aluminum, or a mixture of aluminum and another thermally conductive metal, such as copper or magnesium Another preferred embodiment of the invention is shown in FIGS. 10–11. There, the grate 220 has a grease control assembly 221, a plurality of elongated members 244, and a plurality of openings 246. The grease control assembly 221 has a configuration distinct from that shown in FIGS. 1–9. The grease control assembly 221 comprises an upper grease control assembly 256 and a lower grease control assembly 258. The upper grease assembly 256 generally corresponds to the upper portion of the grate 220 and comprises a single rib group 260 that is generally positioned in the central region 268 of the grate 220.

The rib group 260 is comprised of a plurality of ribs 270 wherein each rib 270 is adapted to direct or guide the flow of grease and byproducts generated while cooking food on the grate 220. As shown in FIG. 4, the rib 270 has a first inclined surface 272 and a second inclined surface 274 that converge to define a peak 276. The first surface 272 has an edge 278 and the second surface 274 has an edge 280, wherein each edge 278, 280 is adjacent an opening 246. Once grease comes into contact with the rib 270, grease migrates down the inclined surfaces 272, 274 to the edges 278, 280 of the rib 270. In this manner, the drainage of grease and/or byproducts occurs in a controlled and directed manner. The slope or pitch of the inclined surfaces 272, 274 varies with the design parameters of the grease control assembly 221. Alternatively, the rib 270 has only a first inclined surface 272 such that the rib 270 has a ramp-like configuration.

Referring to FIG. 11, the lower grease control assembly 262 has a single ridge 300 that depends from a lower surface 302 of the grate 220. The ridge 300 has an outer wall 300*a*, an inner wall 300*b*, and a bottom wall 300*c*. Each of the walls 300*a*, 300*b*, 300*c* have a generally smooth surface. The ridge 300 depends substantially perpendicular to the lower surface 302 of the grate 222. Alternatively, the ridge 300 depends at an angle from the lower surface 302. The ridge 300 defines a cavity 306. Preferably, the cavity 306 does not intersect the openings 246 of the grate 220. The outer ridge 300 is cooperatively positioned with the upper grease control assembly 260. Thus, the cavity 306 is cooperatively positioned with the upper grease control assembly 260.

In the use position P1 where the grate 220 is positioned within the cooking chamber 12, the grease control assembly 221 is positioned generally above a burner. The burner has a configuration that is substantially similar to the configuration of the grease control assembly 221. Specifically, the burner has a rectangular configuration and the rib group 260 has a similar rectangular configuration. As a result, the grease control assembly 221 directs and controls the flow of grease and byproducts such that the grease avoids contact with the burner as it flows to the drain opening in the bottom of the firebox.

In another preferred embodiment, the lower grease control assembly 58 is omitted from the grease control assembly 56. As a result, the grate 20 only has an upper grease control assembly 56 to direct and control grease generated while cooking food on the grate 20. Grease and byproducts would flow and drain from the upper grease control assembly 56 in a manner consistent with that described above. Thus, grease and byproducts will flow to the edges 78, 80 of the ribs 70 and drain vertically downward therefrom. Since the upper grease control assembly 56 is not aligned with the burner 32, grease draining from the edges 78, 80 will not make contact with the burner 32. As an additional measure, the barbecue grill assembly 10 can include a blocking structure positioned between the burner 32 and the grate 20. Specifically, the blocking structure is cooperatively positioned with the upper grease control assembly 56 and the burner 32. Preferably, the blocking structure is positioned slightly above the upper surface of the burner 32 and the blocking structure is cooperatively dimensioned with the burner 32. The blocking structure is made from metal and has a generally thin-wall construction such that heat can transfer through the blocking structure and to the grate 32. The blocking structure can have an angled or peaked construction whereby the structure has a tent-like configuration.

The grate 20 of the present invention provides a number of significant advantages over conventional grates. The grate 20 directs the flow path FP of grease to ensure the removal or drainage of the grease from the firebox 18. This prevents the build-up of grease and byproducts which can negatively affect the performance and operation of the barbecue grill assembly 10. The grate 20 directs and controls the flow of grease and byproducts to ensure the long-term performance and operation of the barbecue grill assembly 10. Furthermore, the grate 20 directs the flow path FP of grease such that it does not make contact with the burner tube 32 during operation of the barbecue grill assembly 10.

While the specific embodiments have been illustrated and described, numerous modifications come to mind without significantly departing from the spirit of the invention and the scope of protection is only limited by the scope of the accompanying Claims.

We claim:

1. A barbecue grill assembly comprising:
a cooking chamber;
a gas burner tube positioned in a lower portion of the cooking chamber and having at least one burner flame region;
a cooking grate removably positioned in an upper portion of the cooking chamber, the grate having a plurality of elongated members defining a cooking surface, a plurality of openings and a grease control assembly, the grease control assembly cooperatively positioned over the burner tube to prevent grease generated by cooking food on the grate from draining onto the burner flame region, wherein the grease control assembly has at least one rib group and at least one ledge, the grease control assembly including at least one generally continuous ridge depending downwardly from a lower surface of the grate.

2. The barbecue grill assembly of claim 1 wherein the rib group comprises a plurality of ribs, each rib having at least one inclined surface extending from the cooking surface towards the lower portion of the cooking chamber.

3. The barbecue grill assembly of claim 2 wherein the inclined surface comprises a first and second inclined surfaces extending from a peak of the rib.

4. The barbecue grill assembly of claim 3 wherein the peak of the rib is positioned below the cooking surface.

5. The barbecue grill assembly of claim 1 wherein each rib and each ledge are positioned over a portion of the burner tube.

6. The barbecue grill assembly of claim 1 wherein the grease control assembly further comprises an outer ridge depending from a lower surface of the grate.

7. The barbecue grill assembly of claim 6 wherein the outer ridge is generally positioned beyond an outer wall of the burner tube.

8. The barbecue grill assembly of claim 6 wherein the grease control assembly further comprises an inner ridge depending from a lower surface of the grate.

9. The barbecue grill assembly of claim 8 wherein the inner ridge is generally positioned beyond an inner wall of the burner tube.

10. The barbecue grill assembly of claim 8 wherein the inner ridge and the outer ridge define a cavity that is positioned over the burner fine region.

11. The barbecue grill assembly of claim 10 wherein the cavity does not intersect the openings.

12. The barbecue grill assembly of claim 1 wherein the cooking grate is positioned directly above the burner tube such that no structure is positioned between the cooking grate and the burner tube.

13. A barbecue grill assembly comprising:
a cooking chamber;
a gas burner tube positioned in a lower portion of the cooking chamber, the burner tube having at least one burner flame region;
a cooking grate removably positioned in an upper portion of the cooking chamber, the grate having a plurality of openings and a plurality of elongated members defining a cooking surface, the grate further having an integral upper grease control assembly and an integral lower grease control assembly, the upper and lower grease control assembly generally over the burner tube to prevent grease generated by cooking food on the grate from draining onto the burner flame region.

14. A barbecue grill assembly comprising:
a cooking chamber;
a gas burner tube positioned in a lower portion of the cooking chamber, the burner tube having at least one burner flame region;
a cooking grate removably positioned in an upper portion of the cooking chamber, the grate having a plurality of openings and a plurality of elongated members defining a cooking surface, the grate further having an upper grease control assembly and a lower grease control assembly, the upper and lower grease control assembly generally positioned over the burner tube to prevent grease generated by cooking food on the grate from draining onto the burner flame region, wherein the upper grease control assembly has a plurality of rib groups and a plurality of ledges.

15. The barbecue grill assembly of claim 14 wherein the rib group comprises a plurality of ribs, each rib having at least one inclined surface extending from the cooking surface towards the lower portion of the cooking chamber.

16. The barbecue grill assembly of claim 15 wherein the inclined surface comprises first and second inclined surfaces that converge to form a peak of the rib.

17. The barbecue grill assembly of claim 14 wherein the rib groups intersect the ledges to define a ventral region of the grate that is not positioned over the burner tube.

18. The barbecue grill assembly of claim 14 wherein the lower grease control assembly further comprises an outer ridge and an inner ridge, each depending from a lower surface of the grate.

19. The barbecue grill assembly of claim 18 wherein the outer ridge is generally positioned beyond an outer wall of the burner tube and the inner ridge is generally positioned over an inner wail of the burner tube.

20. The barbecue grill assembly of claim 18 wherein the inner ridge and the outer ridge define a cavity that is generally positioned over the burner flame region.

21. A cooking grate assembly for use within a cooking chamber of a barbecue grill, the cooking grate assembly comprising:
a plurality of elongated members defining a cooking surface;
a plurality of openings wherein the elongated members and the openings define a grid; and,
an upper grease control assembly and a lower grease control assembly, both assemblies being integrally formed with the grate, the upper and lower grease control assembly adapted to direct the flow of grease generated by cooking food on the grate.

22. A cooking grate assembly for use within a cooking chamber of a barbecue grill, the cooking grate assembly comprising:
   a plurality of elongated members defining a cooking surface;
   a plurality of openings wherein the elongated members and the openings define a grid; and,
   an upper grease control assembly and a lower grease control assembly, the upper and lower grease control assembly adapted to direct the flow of grease generated by cooking food on the grate, wherein the upper grease control assembly has at least one rib group and at least one ledge.

23. The cooking grate assembly of claim 22 wherein the rib group comprises a plurality of ribs, each rib having at least one inclined surface.

24. The cooking grate assembly of claim 22 wherein the lower grease control assembly further comprises an outer ridge depending from a lower surface of the grate.

25. The cooking grate assembly of claim 24 wherein the lower grease control assembly further comprises an inner ridge depending from the lower surface of the grate.

26. The cooking grate assembly of claim 25 wherein the inner ridge is cooperatively positioned with an inner portion of the rib group.

27. The cooking grate assembly of claim 25 wherein the inner ridge and the outer ridge define a cavity.

28. The cooking grate assembly of claim 22 wherein the grate has a length, the upper grease control assembly extending substantially the length of the grate.

29. The cooking grate assembly of claim 22 wherein the grate has a length, the lower grease control assembly extending substantially the length of the grate.

30. A barbecue grill assembly comprising:
   a cooking chamber having a firebox and a moveable cover;
   a gas burner positioned in the firebox and having at least one burner flame region;
   a cooking grate removably positioned in the firebox, the grate having a plurality of elongated members and a grease control assembly, the grease control assembly having a plurality of ribs that are cooperatively positioned over the burner, the grease control assembly further having a first ridge depending from a lower surface of the grate.

31. The barbecue grill assembly of claim 30 wherein the first ridge is generally positioned beyond an outer wall of the burner.

32. The barbecue grill assembly of claim 30 wherein the grease control assembly further comprises a second ridge depending from a lower surface of the grate, the second ridge being generally positioned beyond an inner wall of the burner.

33. The barbecue grill assembly of claim 30 wherein each rib is positioned between a pair of elongated members.

34. The barbecue grill assembly of claim 30, wherein the cooking grate has an external ledge and an inner surface of the cover is cooperatively positioned above the ledge.

* * * * *